(12) United States Patent
Rakshe et al.

(10) Patent No.: US 9,569,453 B1
(45) Date of Patent: Feb. 14, 2017

(54) SYSTEMS AND METHODS FOR SIMULATING FILE SYSTEM INSTANCES

(75) Inventors: Praveen Rakshe, Pune (IN); Laxmikant V. Gunda, Pune (IN)

(73) Assignee: Veritas Technologies, Mountain View, CA (US)

( * ) Notice: Subject to any disclaimer, the term of this patent is extended or adjusted under 35 U.S.C. 154(b) by 598 days.

(21) Appl. No.: 12/687,312

(22) Filed: Jan. 14, 2010

(51) Int. Cl.
*G06F 17/30* (2006.01)
*G06F 11/34* (2006.01)

(52) U.S. Cl.
CPC ..... *G06F 17/30153* (2013.01); *G06F 11/3414* (2013.01); *G06F 17/30067* (2013.01)

(58) Field of Classification Search
None
See application file for complete search history.

(56) References Cited

U.S. PATENT DOCUMENTS

| 6,219,802 B1* | 4/2001 | Beeker et al. ............ 714/32 |
| 2002/0101920 A1* | 8/2002 | Choi et al. ............ 375/240 |
| 2004/0015762 A1* | 1/2004 | Klotz ............ G06F 11/2294 714/742 |
| 2004/0107213 A1* | 6/2004 | Zubeldia et al. ........ 707/104.1 |
| 2008/0022155 A1* | 1/2008 | Wack ............ G06F 11/261 714/40 |
| 2009/0150533 A1* | 6/2009 | McClanahan ..... G06F 17/30194 709/223 |

\* cited by examiner

*Primary Examiner* — Miranda Huang
(74) *Attorney, Agent, or Firm* — Fisherbroyles LLP

(57) ABSTRACT

A computer-implemented method for simulating file system instances may include identifying a file system to host a simulated file system instance. The computer-implemented method may also include intercepting attempts to read from the file system. The computer-implemented method may further include, for each intercepted read attempt, generating data to fulfill the intercepted read attempt. The computer-implemented method may additionally include fulfilling the intercepted read attempt with the generated data. Various other methods, systems, and computer-readable media are also disclosed.

18 Claims, 6 Drawing Sheets

SYSTEMS AND METHODS FOR SIMULATING FILE SYSTEM INSTANCES

BACKGROUND

In the digital age, organizations increasingly depend on a variety of data management systems (e.g., data protection systems, archiving systems, etc.) to efficiently and effectively protect, organize, and analyze their data. Accordingly, data management system vendors may want to ensure that their data management products are efficient and reliable.

In order to properly test data management systems for functionality, scalability, and performance, vendors may require a very large test bed of data (e.g., a file system with tens of millions of files totaling tens of terabytes). In addition to consuming large quantities of storage space, creating a suitably large data set may take a long time (e.g., a couple of weeks). Unfortunately, such storage and time requirements may hinder the efficient and proper testing of data management systems, potentially resulting in delayed or inferior products (or product updates) from data management system vendors. Accordingly, the instant disclosure identifies a need for simulating file system instances to facilitate the efficient and proper testing of data management systems.

SUMMARY

As will be described in greater detail below, the instant disclosure generally relates to systems and methods for simulating file system instances. Embodiments of the instant disclosure may simulate a file system instance by generating data for the file system instance on the fly (e.g., by intercepting read attempts and fulfilling the read attempts with generated data) rather than generating and storing data for an entire file system instance. For example, a method may include identifying a file system to host a simulated file system instance and intercepting attempts to read from the file system. The method may also include generating data, for each intercepted read attempt, to fulfill the intercepted read attempt and fulfilling the intercepted read attempt with the generated data.

The scope of the real-time data generation may vary according to different embodiments. For example, in some embodiments generating data to fulfill the intercepted read attempt may include identifying a target file of the intercepted read attempt and generating content corresponding to at least a part of the target file. Additionally or alternatively, generating data to fulfill the intercepted read attempt may include identifying a target directory of the intercepted read attempt and generating at least one object (e.g., a file or a directory) for the target directory. Generating an object for the target directory may include creating the object in the target directory (e.g., in the file system and/or on a storage device). Creating the object in the target directory may include generating metadata for the object in the target directory, creating a sparse file in the target directory, and/or creating a stub file in the target directory.

In certain embodiments, the method may populate the file system with a directory structure, stub files, and/or sparse files (e.g., in those embodiments in which the method only generates file content on the fly and does not generate directories or files themselves on the fly). In some examples, the method may populate the file system by capturing a structure of a second file system and populating the file system with the structure of the second file system.

The method may generate content corresponding to the target file in a variety of ways. For example, the method may generate random content. Additionally or alternatively, the method may generate pseudorandom content. In some examples, the method may use a seed to generate the pseudorandom content. The seed may be based on metadata of the target file and/or characteristics of the intercepted read attempt. In some embodiments, the method may procedurally generate content corresponding to a type of the target file.

In some examples, the method may identify configuration information for configuring the simulated file system instance. In some of these examples, the method may generate data to fulfill the intercepted read attempt based, at least in part, on the configuration information. In various embodiments, the method may further test a file system application (e.g., a data protection application, an archiving application, etc.) using the file system.

In some examples, a system for simulating file system instances may include an identification module, an interception module, and a generation module. The identification module may be programmed to identify a file system to host a simulated file system instance. The interception module may be programmed to intercept attempts to read from the file system. The generation module may be programmed to generate data, for each intercepted read attempt, to fulfill the intercepted read attempt and to fulfill the intercepted read attempt with the generated data.

The generation module may be programmed to generate data for a variety of read attempts. For example, the generation module may generate data for an attempt to read the contents of a target file. In this example, the generation module may be programmed to identify the target file of the intercepted read attempt and generate content corresponding to at least a part of the target file. In another example, the generation module may generate data for an attempt to read a target directory. In this example, the generation module may be programmed to generate data to fulfill the intercepted read attempt by identifying a target directory of the intercepted read attempt and generating at least one object for the target directory.

The generation module may be programmed to generate the content in a variety of ways. For example, the generation module may be programmed to generate random content. Additionally or alternatively, the generation module may be programmed to generate pseudorandom content with a seed based on metadata of the target file and/or characteristics of the intercepted read attempt. In some examples, the generation module may be programmed to procedurally generate content that corresponds to a type of the target file.

In some embodiments, a computer-readable-storage medium may include one or more computer-executable instructions that, when executed by at least one processor of a computing device, cause the computing device to identify a file system to host a simulated file system instance and intercept attempts to read from the file system. The instructions may also cause the computing device to generate data, for each intercepted read attempt, to fulfill the intercepted read attempt and to fulfill the intercepted read attempt with the generated data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
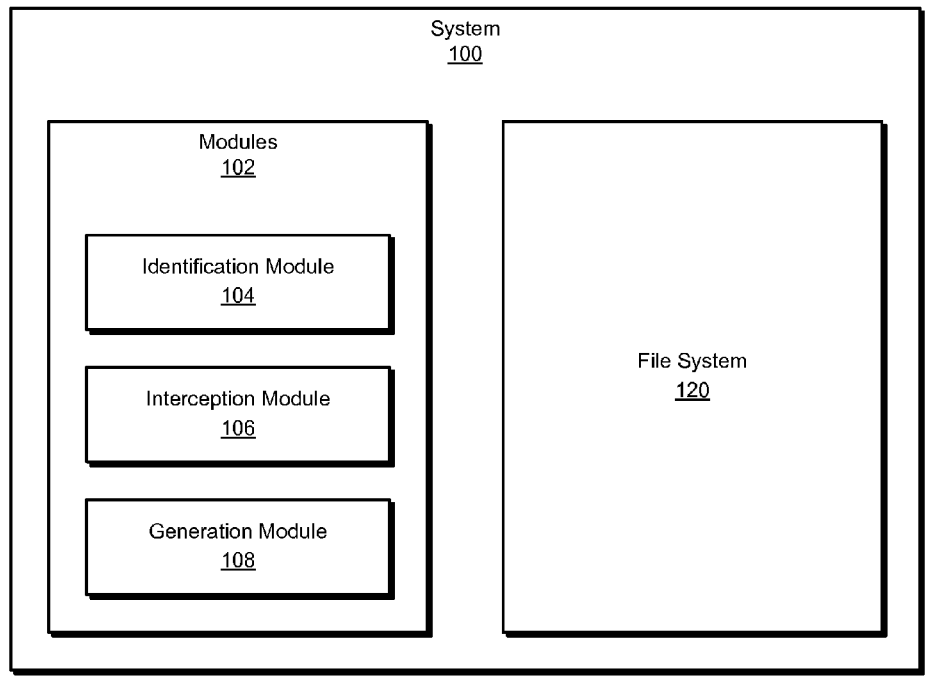
FIG. 1 is a block diagram of an exemplary system for simulating file system instances.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for simulating file system instances. Embodiments of the instant disclosure may simulate a file system instance by intercepting attempts to read from a file system and generating data to fulfill the read attempts rather than reading data from the file system. By generating the data as it is needed rather than reading pre-generated and stored data, embodiments of the instant disclosure may make a large file system instance available (e.g., for testing) without requiring a correspondingly large amount of storage space. Furthermore, by avoiding a pre-generation step, embodiments of the instant disclosure may make a large file system instance available quickly and may avoid generating data that would ultimately go unused.

Figure 2:
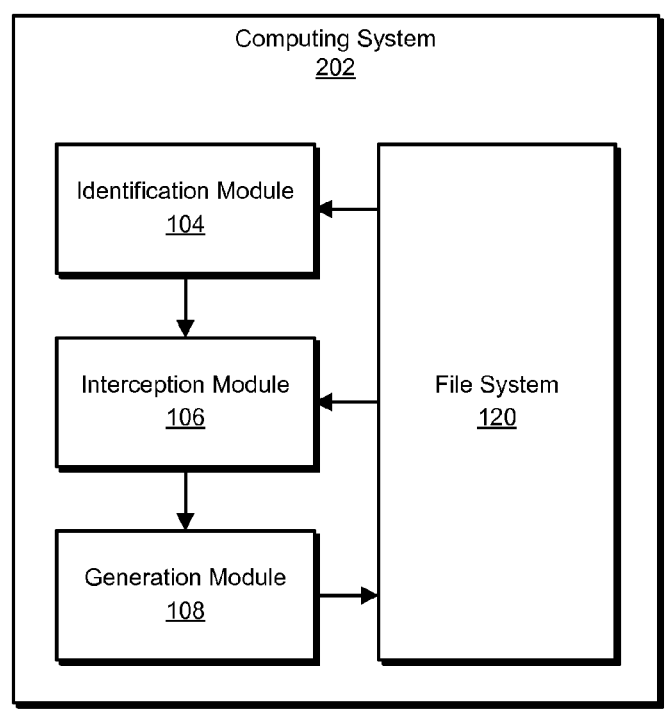
FIG. 2 is a block diagram of an exemplary system for simulating file system instances.

The following will provide, with reference to FIGS. 1-2, detailed descriptions of exemplary systems for simulating file system instances. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for simulating file system instances. As illustrated in this figure, exemplary system 100 may include one or more modules 102 for performing one or more tasks. For example, and as will be explained in greater detail below, exemplary system 100 may include an identification module 104 programmed to identify a file system to host a simulated file instance. Exemplary system 100 may also include an interception module 106 programmed to intercept attempts to read from the file system.

In addition, and as will be described in greater detail below, exemplary system 100 may include a generation module 108 programmed to generate data, for each intercepted read attempt, to fulfill the intercepted read attempt and to then fulfill the intercepted read attempt. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include a file system 120. File system 120 may represent portions of a single file system or computing device or a plurality of file systems or computing devices. For example, file system 120 may represent a portion of computing system 202 in FIG. 2, computing system 510 in FIG. 5, and/or portions of exemplary network architecture 600 in FIG. 6. Alternatively, file system 120 in FIG. 1 may represent one or more physically separate devices capable of being accessed by a computing device, such as computing system 510 in FIG. 5 and/or portions of exemplary network architecture 600 in FIG. 6.

Exemplary system 100 may be deployed in a variety of ways. For example, all or a portion of exemplary system 100 may represent portions of an exemplary system 200 in FIG. 2. As shown in FIG. 2, system 200 may include a computing system 202 including a file system 120. In one embodiment, and as will be described in greater detail below, modules 102 from FIG. 1 may program computing system 202 to simulate a file system instance in file system 120.

For example, identification module 104 may identify a file system, such as file system 120, to host a simulated file system instance. Interception module 106 may then intercept attempts to read from file system 120. Generation module 108 may generate data for each intercepted read attempt to fulfill the intercepted read attempt. Generation module 108 may then fulfill the intercepted read attempt with the generated data.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Figure 3:
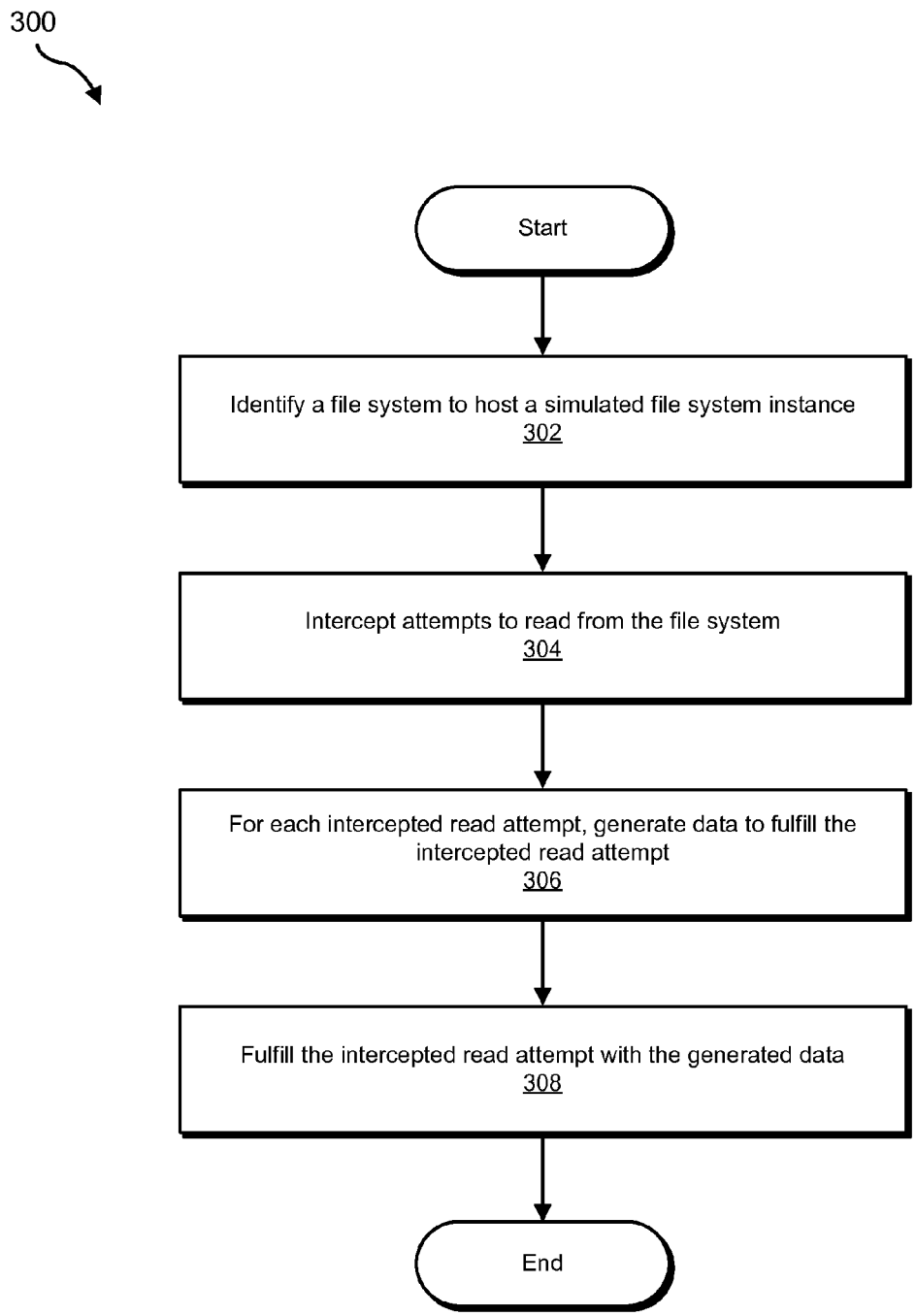
FIG. 3 is a flow diagram of an exemplary method for simulating file system instances.

FIG. 3 is a flow diagram of an exemplary computer-implemented method 300 for simulating file system instances. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a file system to host a simulated file system instance. For example, at step 302 identification module 104 may, as part of computing system 202, identify file system 120. As used herein, the phrase "file system" may refer to any system for storing and/or organizing files. For example, file system 120 of FIG. 2 may include VERITAS FILE SYSTEM, NTFS, EXT3, FAT, and/or any other suitable file system. Additionally or alternatively, "file system" may refer to a system for storing and/or organizing data (e.g., a database). As used herein, the phrase "simulated file system instance" may refer to any simulation of a set of data populating a file system.

Identification module 104 may perform step 302 in any suitable manner. For example, identification module 104 may identify the file system to host the simulated file system instance by reading a configuration file identifying the file system. Additionally or alternatively, identification module 104 may identify the file system by receiving a message identifying the file system. In some contexts, systems described herein may simulate the file system as well as content in the file system. In these contexts, identification module 104 may identify the file system as part of simulating the file system.

At step 304 one or more of the systems described herein may intercept attempts to read from the file system. For example, at step 304 interception module 106 may, as part of computing system 202, intercept attempts to read from file system 120.

Figure 4:
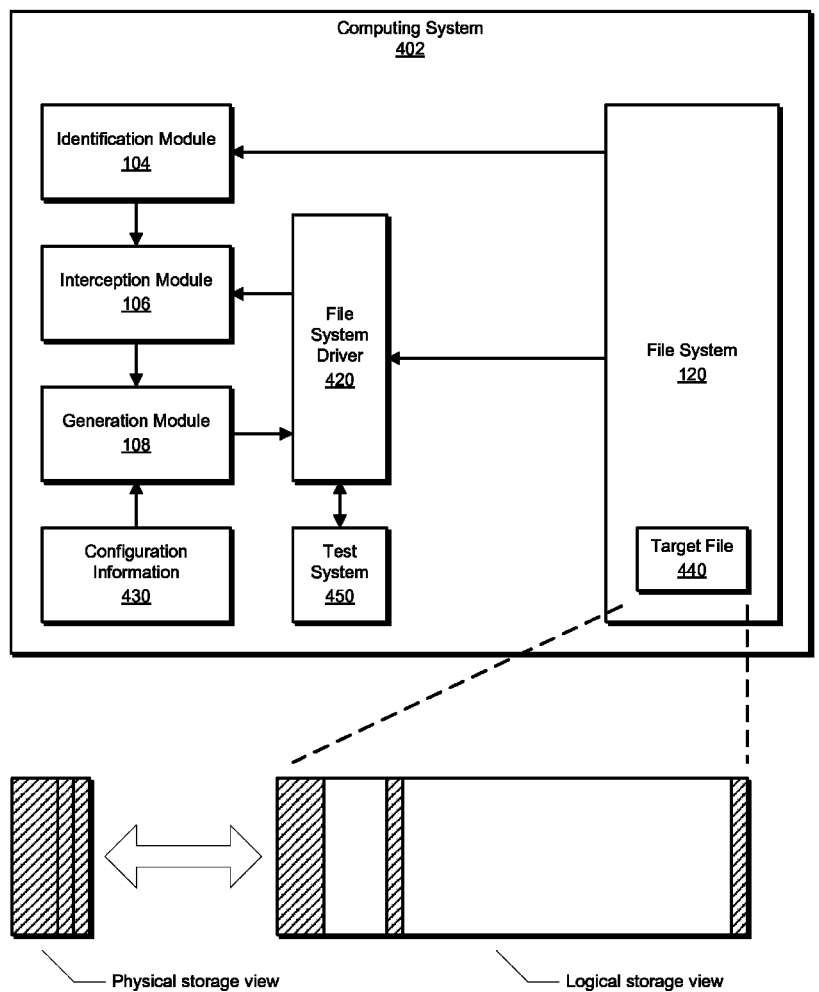
FIG. 4 is a block diagram of an exemplary system for simulating file system instances.

Interception module 106 may perform step 304 in a variety of ways. For example, interception module 106 may include portions of a file system driver (e.g., a file system driver filter). In this example, interception module 106 may intercept attempts to read from the file system as they reach the file system driver. For example, FIG. 4 illustrates a computing system 402 programmed with interception module 106. A test system 450 may attempt to read files from file system 120. A file system driver 420 may process these read attempts and redirect them to interception module 106.

In another example, interception module 106 may intercept attempts to read from the file system as the attempts reach a storage device controller. In some contexts, the file system may reside within a virtualized environment. In these contexts, interception module 106 may reside outside the virtualized environment and intercept attempts to read from the file system by interfering with the virtualized environment (e.g., via a hypervisor).

In some embodiments, interception module 106 may intercept every attempt to read from the file system. In other embodiments, interception module 106 may only intercept certain attempts to read from the file system. For example, interception module 106 may only intercept read attempts from a certain application, such as a testing application (e.g., test system 450 in FIG. 4). Additionally or alternatively, interception module 106 may only intercept read attempts accompanied by a flag and/or performed under a certain environment configuration.

Returning to FIG. 3, at step 306 one or more of the systems described herein may, for each intercepted read attempt, generate data to fulfill the intercepted read attempt. For example, at step 306 generation module 108 may, as part of computing system 202, generate data to fulfill an intercepted attempt to read from file system 120.

Generation module 108 may perform step 306 in a variety of contexts. For example, interception module 106 may have intercepted an attempt to read from a file (the "target file" of the read attempt). In this context, generation module 108 may generate data to fulfill the intercepted read attempt by identifying the target file of the read attempt and generating content corresponding to the target file (e.g., generating content corresponding to the part of the target file at which the intercepted read attempt was directed). Using FIG. 4 as an example, test system 450 may attempt to read a target file 440 from file system 120. Interception module 106 may intercept the attempt after it reaches file system driver 420. Generation module 108 may then generate data for the read attempt (in lieu of actually reading from target file 440).

Generation module 108 may generate content corresponding to the target file in a variety of ways. For example, generation module 108 may simply generate random content (e.g., a random string matching the size of the read attempt). In another example, generation module 108 may generate pseudorandom content. In some embodiments, generation module 108 may generate the pseudorandom content using a seed based on metadata of the target file (e.g., the file path and/or name, the apparent size of the file, the apparent creation time of the file, etc.) and/or one or more characteristics of the intercepted read attempt (e.g., the file and/or storage location at which the intercepted read attempt was directed). In this manner, generation module 108 may generate consistent content across intercepted read attempts (e.g., if a test system attempts to read from the same file twice, the content of the file may appear the same, even if the content is generated both times).

Generation module 108 may also generate content corresponding to the target file by procedurally generating content that corresponds to a type of the target file. As used herein, "procedural generation" may refer to any method for creating content according to a structure and/or algorithm. A "type" of a file may refer to any classification and/or characteristic of a file. For example, the "type" of a file may refer to a file format (e.g., MPEG-1 AUDIO LAYER 3 ("MP3"), MICROSOFT WORD DOCUMENT ("DOC"), EXECUTABLE AND LINKING FORMAT ("ELF"), PORTABLE NETWORK GRAPHIC ("PNG") etc.).

Generation module 108 may procedurally generate content for the target file corresponding to the type of the target file using a variety of techniques. For example, generation module 108 may use an algorithm to create content that is valid according to the file format of the target file. In some examples, generation module 108 may use templates to generate headers or other highly structured information for some file formats. In some embodiments, generation module 108 may generate internally consistent content (e.g., generation module 108 may generate content corresponding to the target file that is consistent with information in the header of the target file). By procedurally generating content, generation module 108 may enable systems described herein to more accurately simulate file system instances such that the content of files in the simulated file system instance matches the expected format of the files. This may allow for more sophisticated testing procedures (e.g., testing file system applications that analyze the content of files).

In some embodiments, generation module 108 may accept plug-ins for procedurally generating content for different file formats. In some examples, generation module 108 may be configured to generate invalid content for some files for testing purposes (e.g., generation module 108 may generate invalid content for one percent of DOC files).

Returning to step 306 of FIG. 3, generation module 108 may generate directories and files in addition to file content. For example, interception module 106 may intercept an attempt to read a directory (e.g., list files in a directory). In this example, generation module 108 may generate data to fulfill the intercepted read attempt by identifying the target directory of the intercepted read attempt and generating one or more objects for the target directory.

In some embodiments, generation module 108 may simply generate the objects without writing them to the file system. In other embodiments, generation module 108 may actually create the objects in the target directory on the file system. For example, generation module 108 may generate metadata for the objects (e.g., file name, file size, creation date, file permissions, etc.) and create stub files and/or sparse files in the target directory. For example, FIG. 4 illustrates target file 440 as a sparse file. While the logical storage view of target file 440 shows a large space allocated for target file 440, the physical storage view of target file 440 shows that only portions of target file 440 with content consume storage space. In some embodiments, files such as target file 440 may be stub files containing no data.

Generation module 108 may use similar techniques to generate directories, file metadata, stub files, and/or sparse files as it may use to generate file content. For example, generation module 108 may randomly generate file metadata, pseudorandomly generate file metadata (using a seed based on the context in which the file metadata is generated), and/or procedurally generate file metadata (e.g., simulating a typical UNIX file system structure by placing executable files in a "/bin" directory).

As mentioned above, generation module 108 may generate directories and files as well as the content of the files when any of these are subject to a read request (e.g., on the fly). However, in some embodiments generation module 108 may pre-populate the file system with a directory structure, stub files, and/or sparse files. For example, generation module 108 may use one or more of the generation techniques described above (random, pseudorandom, and procedural generation) to populate the file system. Additionally or alternatively, generation module 108 may populate the file system by capturing the structure of a second file system and populating the file system with the structure of the second file system. For example, an agent on a remote computing system may record the directory structure and file metadata of the second file system. Generation module 108 may then populate the file system with this directory structure and file metadata (e.g., using sparse files) without copying the contents of the files in the second file system to the sparse files in the file system. In this manner, systems described herein may use the second file system as a model for testing purposes.

The various data generation techniques described above may prove useful in multiple contexts. For example, a data management system vendor may configure generation module 108 to randomly generate a file system structure (e.g., directories with sparse files) for internal testing of a data management system in development. In another example, a data management system vendor may capture the structure of a customer's file system and configure generation module 108 to populate a simulated file system instance with the customer's file system structure in order to test a data management system for the customer's configuration (e.g., to attempt to replicate and locate a bug reported by the customer or to observe and address a performance problem experienced by the customer).

Returning to FIG. 3, at step 308 one or more of the systems described herein may (for each intercepted read attempt) fulfill the intercepted read attempt with the generated data. For example, at step 308 generation module 108 may, as part of computing system 202, fulfill an intercepted attempt to read from file system 120 with the generated data.

Generation module 108 may perform step 308 in any suitable manner. For example, generation module 108 may include portions of a file system driver. In this example, generation module 108 may fulfill the intercepted read attempt via the file system driver. For example, FIG. 4 illustrates a computing system 402 programmed with interception module 106. A test system 450 may attempt to read files from file system 120. A file system driver 420 may process these read attempts and redirect them to interception module 106. Generation module 108 may then generate data for these read attempts and allow file system driver 420 to return the generated data to test system 450.

In some embodiments, generation module 108 may additionally write the generated data to the target of the read attempt (e.g., so that the data need not be generated again if another read attempt is made on the target of the read attempt). In certain embodiments, generation module 108 may only sometimes write the generated data to the target of the read attempt. For example, generation module 108 may only write the generated data to the target of the read attempt for caching purposes (e.g., generation module 108 may determine that another read attempt on the same target is likely). In another example, in those embodiments in which generation module 108 generates the directory structure of the simulated file system instance, generation module 108 may write only generated directories and sparse or stub files without writing the content of the files to the file system.

Systems and methods described herein may additionally identify configuration information for configuring the simulated file system instance (e.g., by reading a configuration file or receiving a message that includes the configuration information). The configuration information may include any information influencing and/or determining the characteristics of the simulated file system instance. For example, the configuration information may influence and/or determine file system structure and/or file metadata, such as the number of files in the simulated file system instance, the size distribution of the files, the file types of the files, etc. Additionally or alternatively, the configuration information may influence the content generated for attempts to access the files.

As an example, generation module 108 may identify the configuration information. When generation module 108 generates data to fulfill the intercepted read attempt, generation module 108 may generate the data based at least in part on the configuration information. Using FIG. 4 as an example, interception module 106 may intercept a read attempt. Generation module 108 may then use configuration information 430 to determine what data to generate for the read attempt. For example, if configuration information 430 specifies that files in the simulated file system instance should be between one and ten megabytes large, generation module 108 may constrain the random generation of the size of a sparse file that it generates to that range.

Systems and methods described herein may also test a file system application using the file system. As used herein, the phrase "file system application" may refer to any application and/or system that may be tested using a file system instance. Examples of file system applications may include data protection systems, data archiving systems, data mining systems, data reporting systems, data loss prevention systems, anti-virus systems, etc.

Using FIG. 4 as an example, test system 450 may include a system for testing a file system application. Test system 450 may send a message to file system driver 420 to create a simulated file system instance in file system 120. Additionally or alternatively, identification module 104 may configure file system driver 420 to recognize I/O from test system 450 and to fulfill I/O requests from test system 450 via a simulated file system instance. Generation module 108 may pre-populate file system 120 with directories and sparse files for the simulated file system instance. Additionally or alternatively, generation module 108 may generate directories and sparse files for the simulated file system instance on the fly as it receives attempts to list directories and/or enumerate files from test system 450. As interception module 106 intercepts attempts by test system 450 to read from file system 120, generation module 108 may generate content (e.g., based on the context of the attempt and/or configuration information 430) to fulfill the read attempt. Generation module 108 may then fulfill the intercepted read attempt (e.g., via file system driver 420 back to test system 450).

Figure 5:
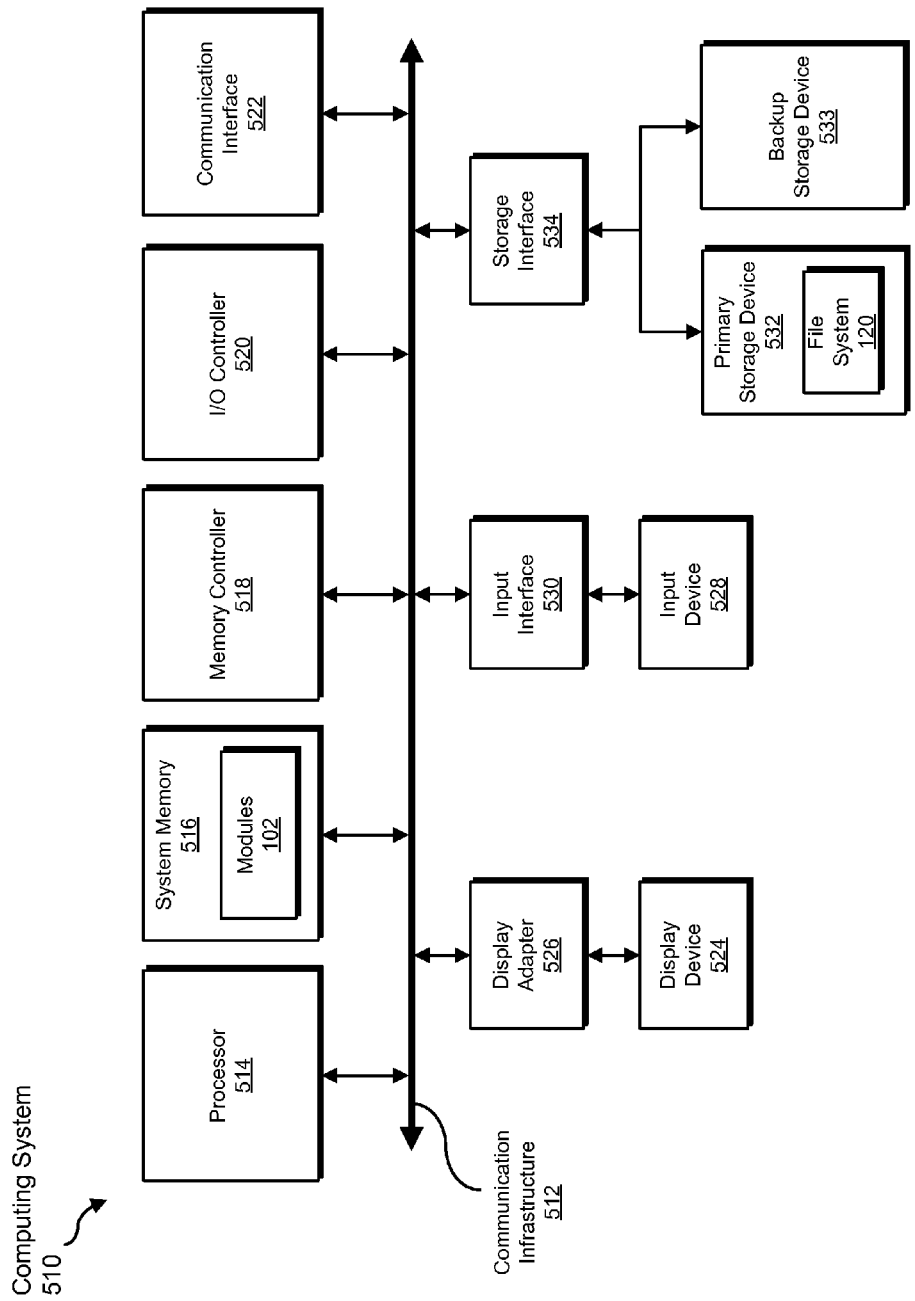
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, intercepting, generating, creating, fulfilling, populating, capturing, and/or testing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, intercepting, generating, creating, fulfilling, populating, capturing, and/or testing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, intercepting, generating, creating, fulfilling, populating, capturing, and/or testing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, intercepting, generating, creating, fulfilling, populating, capturing, and/or testing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, intercepting, generating, creating, fulfilling, populating, capturing, and/or testing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, file system 120 from FIG. 1 may be configured on primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, intercepting, generating, creating, fulfilling, populating, capturing, and/or testing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
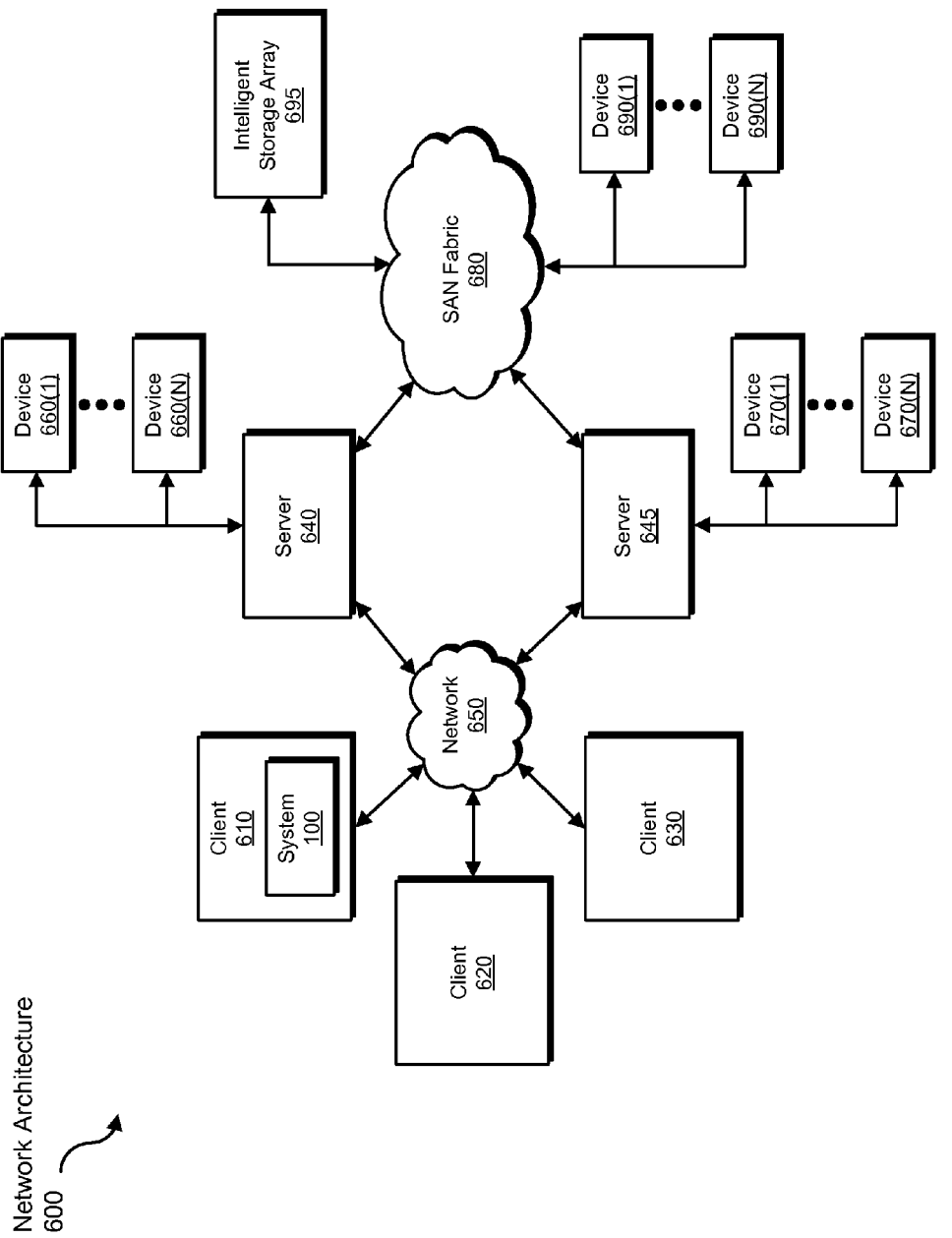
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, intercepting, generating, creating, fulfilling, populating, capturing, and/or testing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for simulating file system instances.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of systems described herein may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing system into an efficient file system application testing system. Additionally or alternatively, one or more of the modules described herein may transform a file system into a host of a simulated file system instance.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for simulating file system instances, at least a portion of the method being performed by a computing device comprising at least one processor, the method comprising:
   identifying a file system to host a simulated file system instance, the simulated file system instance simulating an amount of data within the simulated file system instance without actually storing the amount of data within storage space;
   identifying configuration information for configuring the simulated file system instance, the configuration information determining a number of files in the simulated file system instance and a size distribution of the files;
   intercepting, by a file system driver filter, an attempt to list files within a target directory;
   intercepting, by the file system driver filter, a file access request that attempts to read from a specified target file within the target directory;
   simulating the file system instance at least in part by:
   generating a sparse file for the specified target file in the target directory in response to intercepting the attempt to list files within the target directory;
   after the file access request is intercepted, generating data to fulfill the intercepted file access request based, at least in part, on the configuration information; and
   fulfilling the intercepted file access request with the generated data rather than actually reading data from the file system.

2. The computer-implemented method of claim 1, wherein generating data to fulfill the intercepted file access request comprises
   generating content corresponding to at least a part of the specified target file.

3. The computer-implemented method of claim 2, wherein generating content corresponding to at least a part of the target file comprises generating random content.

4. The computer-implemented method of claim 2, wherein generating content corresponding to at least a part of the target file comprises generating pseudorandom content with a seed based on at least one of:
   metadata of the target file; and
   characteristics of the intercepted file access request.

5. The computer-implemented method of claim 2, wherein generating content corresponding to at least a part of the target file comprises procedurally generating content that corresponds to a type of the target file.

6. The computer-implemented method of claim 1, wherein generating data to fulfill the intercepted file access request comprises:
   identifying the target directory as specified by the intercepted file access request; and
   generating at least one object for the target directory.

7. The computer-implemented method of claim 6, wherein generating at least one object for the target directory comprises creating the object in the target directory.

8. The computer-implemented method of claim 7, wherein creating the object in the target directory comprises at least one of:
   generating metadata for the object in the target directory; and
   creating a stub file in the target directory.

9. The computer-implemented method of claim 1, further comprising populating the file system with at least one of:
   a directory structure;
   stub files; and
   sparse files.

10. The computer-implemented method of claim 9, wherein populating the file system comprises:
    capturing a structure of a second file system; and
    populating the file system with the structure of the second file system.

11. The computer-implemented method of claim 1, further comprising testing a file system application using the simulated file system instance.

12. A system for simulating file system instances, the system comprising:
    an identification module programmed to:
    identify a file system to host a simulated file system instance, the simulated file system instance simulating an amount of data within the simulated file system instance without actually storing the amount of data within storage space;
    identify configuration information for configuring the simulated file system instance, the configuration information determining a number of files in the simulated file system instance and a size distribution of the files;
    an interception module programmed to:
    intercept, through a file system driver filter, an attempt to list files within a target directory;
    intercept, through the file system driver filter, a file access request that attempts to read from a specified target file within the target directory;
    a generation module programmed to simulate the file system instance at least in part by:
    generating a sparse file for the specified target file in the target directory in response to intercepting the attempt to list files within the target directory;
    after the file access request is intercepted, generating data to fulfill the intercepted file access request based, at least in part, on the configuration information;
    fulfilling the intercepted file access request with the generated data rather than actually reading data from the file system; and
    at least one processor configured to execute the identification module, the interception module, and the generation module.

13. The system of claim 12, wherein the generation module is programmed to generate data to fulfill the intercepted file access request
    at least in part by generating content corresponding to at least a part of the specified target file.

14. The system of claim 12, wherein the file system driver filter is programmed to redirect the intercepted file access request from the file system to the interception module.

15. The system of claim 13, wherein the generation module is programmed to generate content corresponding to at least a part of the target file by generating pseudorandom content with a seed based on at least one of:
    metadata of the target file; and
    characteristics of the intercepted file access request.

16. The system of claim 13, wherein the generation module is programmed to generate content corresponding to at least a part of the target file by procedurally generating content that corresponds to a type of the target file.

17. The system of claim 12, wherein the generation module is programmed to generate data to fulfill the intercepted file access request by:
    identifying the target directory as specified by the intercepted file access request; and
    generating at least one object for the target directory.

18. A non-transitory computer-readable medium comprising one or more computer-executable instructions that, when executed by at least one processor of a computing device, cause the computing device to:
- identify a file system to host a simulated file system instance, the simulated file system instance simulating an amount of data within the simulated file system instance without actually storing the amount of data within storage space;
- identifying configuration information for configuring the simulated file system instance, the configuration information determining a number of files in the simulated file system instance and a size distribution of the files;
- intercept, by a file system driver filter, an attempt to list files within a target directory;
- intercept, by the file system driver filter, a file access request that attempts to read from a specified target file within the target directory;
- simulate the file system instance at least in part by:
- generating a sparse file for the specified target file in the target directory in response to intercepting the attempt to list files within the target directory;
- after the file access request is intercepted, generating data to fulfill the intercepted file access request based, at least in part, on the configuration information;
- fulfilling the intercepted file access request with the generated data rather than actually reading from the file system.

* * * * *